E. BLESS.

Improvement in Swedges for Forming Cutters for Nail Machines.

No. 115,563.  Patented June 6, 1871.

INVENTOR.
Eleazar Bless

WITNESSES:
O. F. Mayhew
Smith Weeks

UNITED STATES PATENT OFFICE.

ELEAZAR BLESS, OF INDIANAPOLIS, INDIANA.

IMPROVEMENT IN SWAGES FOR FORMING CUTTERS FOR NAIL-MACHINES.

Specification forming part of Letters Patent No. 115,563, dated June 6, 1871.

I, ELEAZAR BLESS, of Indianapolis, in the county of Marion and State of Indiana, have invented a certain Swage in which to Form the Moving and Stationary Cutters of Nail-Machines, of which the following is a specification:

Nature and Objects of the Invention.

My present invention relates to forming the moving and stationary cutters for making pyramidal-pointed nails, as secured to me by Letters Patent dated January 3, 1871; and it consists in the form of the swage or die in which they are formed; the object being to enable me to make said cutters easily and economically.

Description of the Accompanying Drawing.

Figure 1:
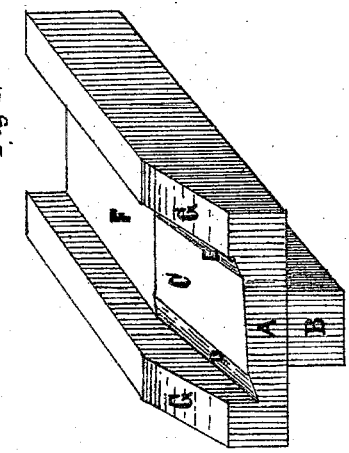
Figure 2:
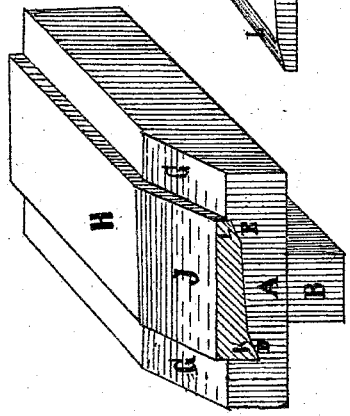
Figure 3:
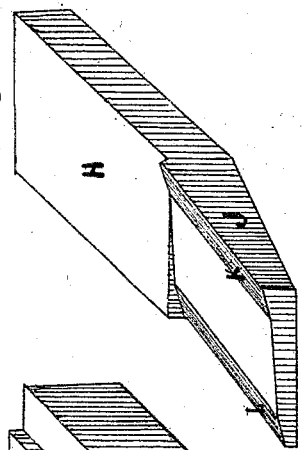
Figure 4:
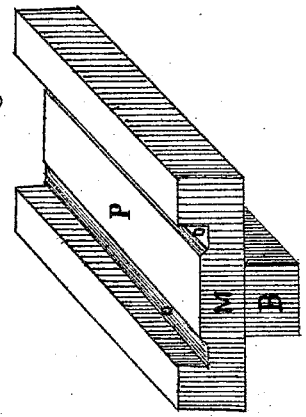
Figure 5:
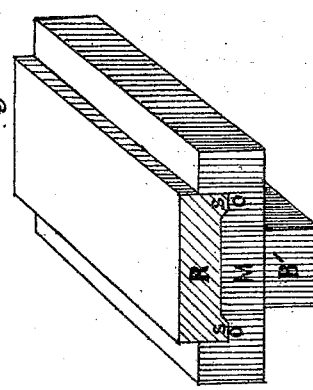
Figure 6:
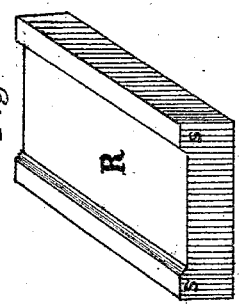

Figure 1 is a perspective view of the die or former in which to swage the moving cutter. Fig. 2 is a view of the same, with the cutter shown as formed therein. Fig. 3 is a view of the moving cutter as formed in the swage or die. Fig. 4 is a perspective view of the die in which to swage the anvil or stationary cutter. Fig. 5 is a view of the same, with the anvil represented as formed therein. Fig. 6 is a perspective view of the anvil or stationary cutter as formed in the swage M.

General Description.

A, Figs. 1 and 2, is the die or former, made of steel in the usual manner, and formed as shown, in which to swage the moving cutter H to the required form to cut nails, as described in the Letters Patent granted to me as above referred to. The stock B is designed to enter a mortise in the block on which the swage rests, to keep the latter in position. M, Figs. 4 and 5, is the die or former, formed as shown, in which to swage the stationary cutter or anvil R, the stock B being for the same purpose as above described.

The process of swaging being familiar to all skilled in such work, and being no part of my invention, does not require description.

Claim.

I claim as my invention—

The swaging-dies A and M, formed as shown, to mold the moving and stationary cutters, substantially as set forth.

ELEAZAR BLESS.

Witnesses:
O. F. MAYHEW,
WM. H. WEEKS.